United States Patent [19]

Parmann

[11] 4,061,459
[45] Dec. 6, 1977

[54] COMBINED MOLD ELEMENT AND SEALING RING

[76] Inventor: Gunnar Parmann, 5076 Alvoy, Norway

[21] Appl. No.: 766,516

[22] Filed: Feb. 7, 1977

Related U.S. Application Data

[63] Continuation-in-part of Ser. No. 608,758, Aug. 28, 1975, Pat. No. 4,030,872.

[51] Int. Cl.² ........................................... B29C 17/02
[52] U.S. Cl. ..................... 425/403; 425/393; 425/DIG. 44; 425/DIG. 218
[58] Field of Search .............. 425/384, 392, 393, 403, 425/DIG. 44, DIG. 218

[56] References Cited

U.S. PATENT DOCUMENTS

| 3,377,659 | 4/1968 | Hucks | 425/392 |
| 3,773,456 | 11/1973 | Salz et al. | 425/393 X |
| 3,776,682 | 12/1973 | Parmann | 425/393 X |
| 3,907,481 | 9/1975 | Heisler | 425/393 |

Primary Examiner—J. Howard Flint, Jr.
Attorney, Agent, or Firm—Kenyon & Kenyon, Reilly, Carr & Chapin

[57] ABSTRACT

The combined mold element and sealing ring is formed of an elastically yieldable body and a rigid reinforcing non-elastic member within the body on a side spaced away from the leading edge of the body. The unit may be generally drop-shape, or otherwise, and is formed with minimal bulk.

Positioning of the reinforcing member close to the outer radial portion of the elastic body reduces the manufacturing costs of the combined element as the bulk of the element may be reduced and the positioning of the rigid member in the rubber molds is facilitated. The reduced bulk also facilitates the molding of a thermoplastic pipe end over the unit to form a socket by reduced stretching of the pipe.

The positioning of the rigid ring member also facilitates the anchoring effect of the combined element when used in a pipeline with internal pressure.

15 Claims, 11 Drawing Figures

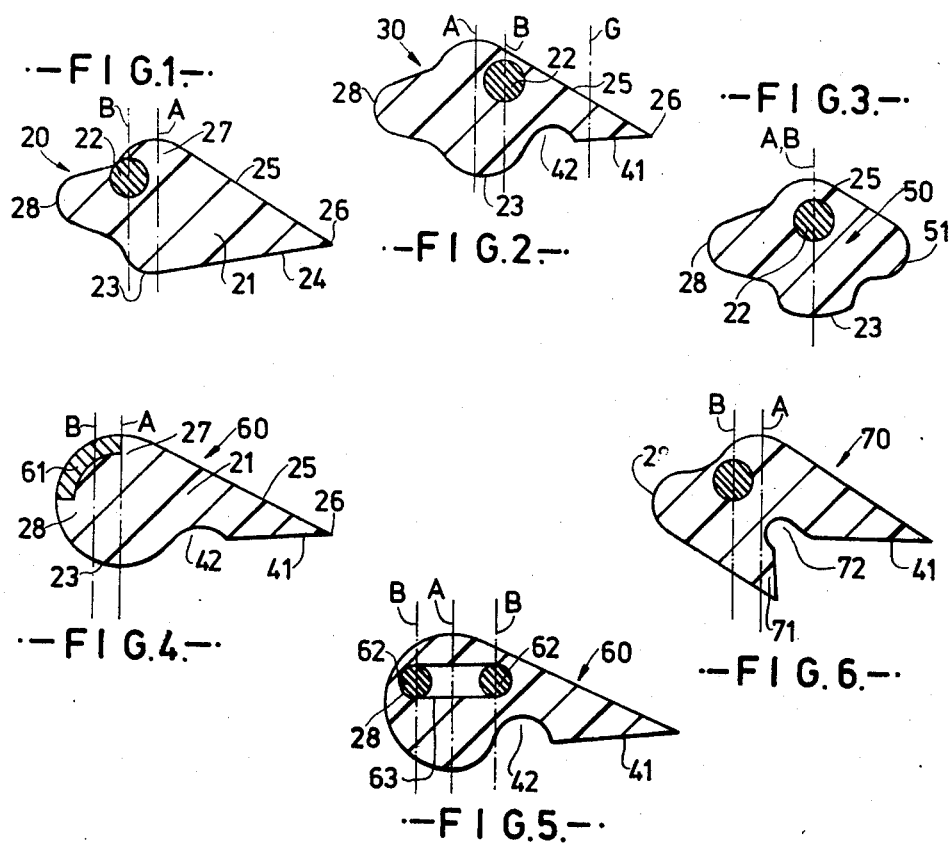
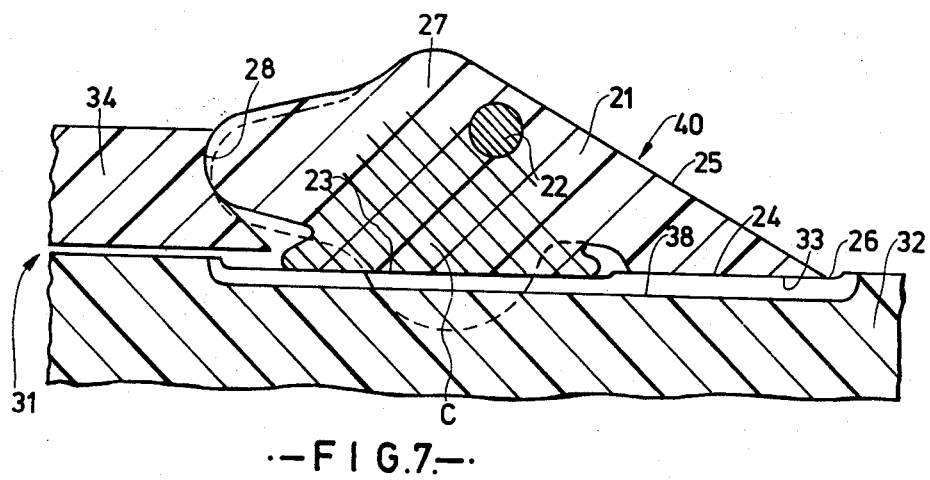

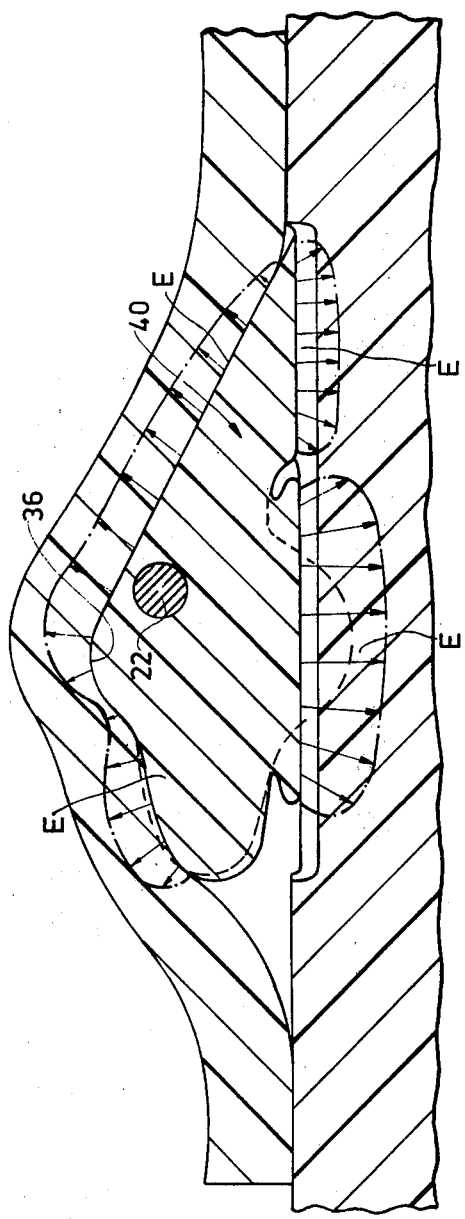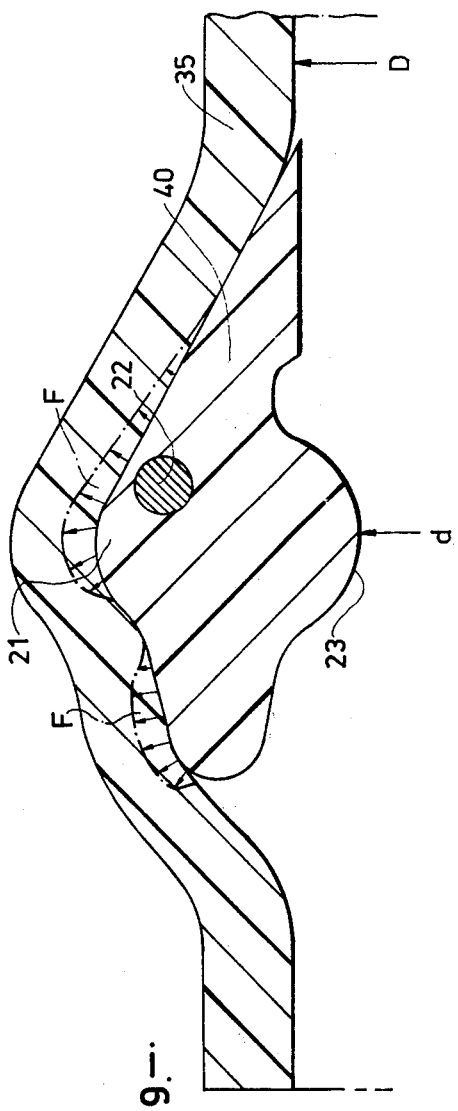

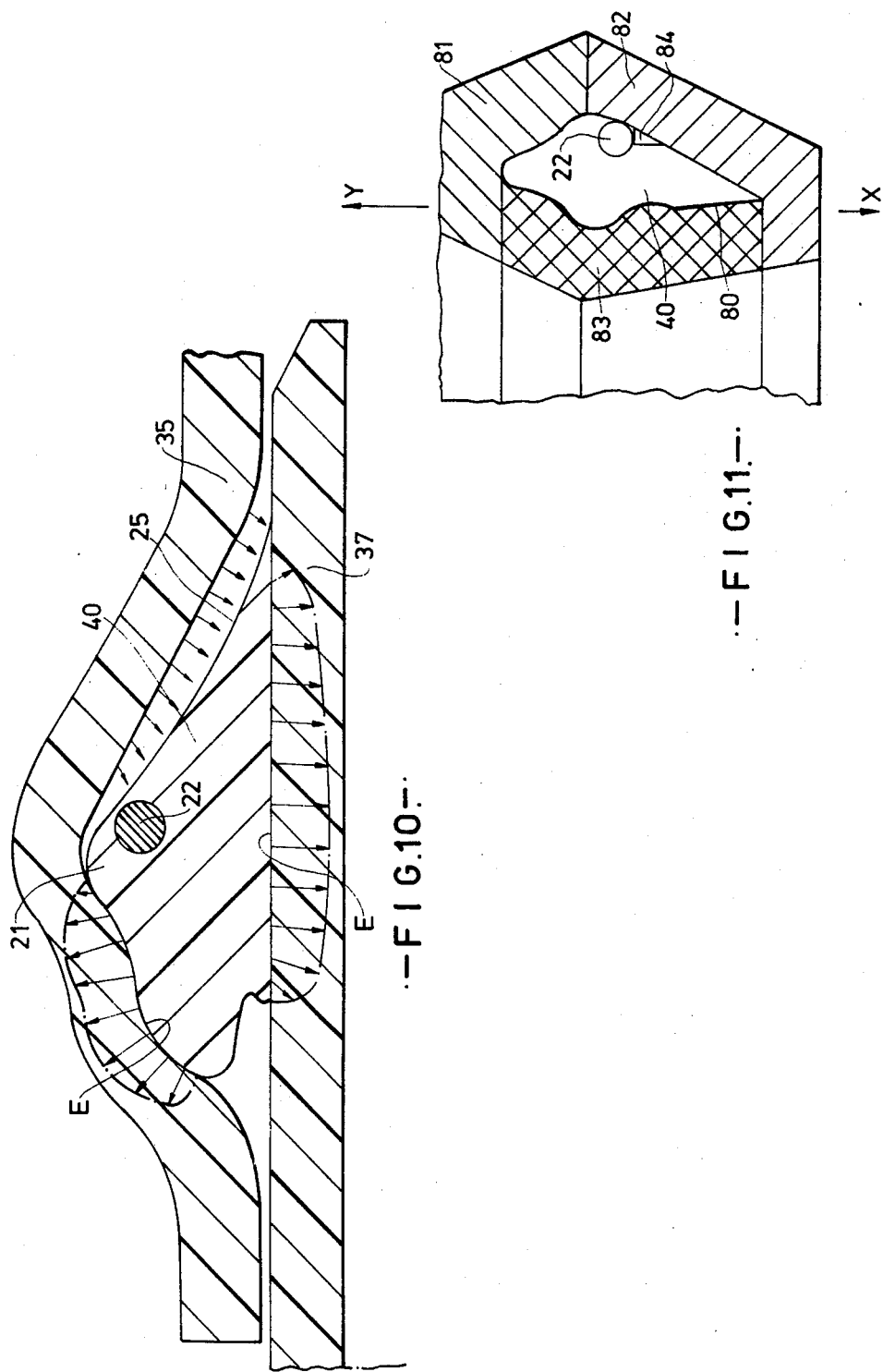

COMBINED MOLD ELEMENT AND SEALING RING

This application is a continuation-in-part of my copending application Ser. No. 608,758, filed Aug. 28, 1975, now U.S. Pat. No. 4,030,872.

This invention relates to a combined mold element and sealing ring. More particularly, this invention relates to a reinforced combined forming element and sealing ring for sealing pipe socket joints which may be exposed to high internal pressures as well as low pressure and vacuum.

As described in my copending application, the combined mold element and sealing ring has two distinct and different purposes, i.e., one as a mold element and one as a sealing ring. In this respect, the expressions "mold element" and "sealing ring" are used hereinafter to clarify distinct effects in each case. It will, however, be understood that both expressions refer to one and the same construction unit. For example, the sealing ring is used for sealing off a joint between a socket end and an insert end of two cooperating pipes which are formed from thermoplastic material. The mold or forming element is used as a portion of a body of a mold for both fabricating the socket end of one pipe and simultaneously inserting the ring in an internal groove or raceway in the socket end produced thereby. Usually, the mold element is mounted on a drift for this purpose and is made of an elastically yieldable material such as rubber Generally, during assembling and joining of the spigot and socket ends, the sealing ring will be compressed in a manner corresponding substantially to the compression which the mold element is exposed to during the disassembling of the mold element from the drift. Usually, the drift has an external form corresponding essentially to the internal form of the pipe socket to be produced. The internal form of the pipe to be produced is, thus, substantially cylindrical with a sealing ring extending somewhat radially inwards so as to provide a seal against a spigot end of a pipe which is to be inserted in the socket. However, when the spigot is inserted into the socket, it is of importance that the sealing ring is not dislocated or pushed out of the groove even if the spigot is not properly chamfered.

Further, it is known that the expansion of the grooved portion of the socket end, wherein the sealing ring is supported, stretches this portion into a relatively thin and, thus, weakened pipe wall. During storage and transportation, therefore, the pipes usually rest on the most stretched out parts of the pipe ends. Unintentional earth loading, traffic load, stones and the like will also be more easily transferred to these most outwardly projecting parts of the socket end. Hence, a support of these parts is advantageous to prevent unintended deformations, and even breakages, as a consequence of blows as may readily occur during transportation and handling of the pipes as well as during installation of the pipelines. In connection with heat strains in the pipe, such as can occur on storage (slacking of the pipes) in hot summer weather, and by use close to sources of heat (steam pipes in the same ditch) etc., there is an advantage in bracing the annular groove by use of a stiffened sealing ring to avoid deformation and the like which may lead to loss of compression and leakages.

Accordingly, it is an object of the invention to provide a combined mold element and sealing ring which will not be pushed out of a groove of a pipe socket during insertion of a spigot which is not properly chamfered.

It is another object of the invention to reduce the stretching of the material in a socket end of a pipe during fabrication.

It is another object of the invention to strengthen the socket end of a pipe and to reduce the risk of unintended deformations.

It is another object of the invention to provide a reinforced combined forming element and sealing ring for sealing pipe socket joints which may be exposed to high internal pressures as well as low pressure and vacuum.

It is another object of the invention to produce a sealing ring with a minimal cross-section and, thus, a minimum volume in order to reduce the manufacturing costs of the sealing ring as much as possible.

It is another object of the invention to provide a combined forming element and sealing ring with very close tolerances to ensure a safe and relatively constant compression in pipe joints while simultaneously lowering the manufacturing cost of the ring.

It is another object of the invention to produce a combined forming element and sealing ring where the molding of the element with the reinforcing member is facilitated by placing the reinforcing ring member in preferred locations in the molds to avoid dislocations of the reinforcing member during the molding of the combined element and by diameter variations due to tolerances of the reinforcing ring diameter.

It is another object of the invention to have a combined element where the outer contours of the element correspond with the forming properties of a hot thermoplastic pipe end.

Briefly, the invention provides a combined mold element and sealing ring comprising an annular body of elastically yieldable material and a rigid reinforcing non-elastic member disposed in the body. The annular body has opposite side portions, an inner peripheral surface defining at least one radially inwardly protruding sealing portion located between the opposite side portions, and an outer peripheral surface having an outer radially directed surface portion located between the side portions. The rigid reinforcing non-elastic member is located in an area defined between the opposite side portions and is spaced radially outside the protruding sealing portion.

The combined mold element and sealing ring can be used to form a groove with a locked in sealing ring during the socketing operation of a hot end of a pipe. By locating the rigid reinforcing element of the combined element in the outer radial portion, the anchoring effect of the element within the socket of the pipe is facilitated.

The hot pipe can be formed with rather steep angles and small curves in the most stretched portions of the groove. Also, by allowing the hot pipe end to be sucked down with a steep angle in front of the outer radial portion of the combined element, the anchoring effect is improved. A steep angle is achieved by making a step in the outer radial portion of the mold for manufacturing the combined elements and, at the same time, the positioning of the rigid member may be facilitated during the molding operation by positioning the ring member at the step in the mold. In order to anchor the sealing ring against being pressed out in the annular gap between spigot and socket by internal pressure in the pipeline, it is advantageous to position the rigid ring member close to the rear of the combined element. In order to anchor the sealing ring against being dislocated or pushed out of the groove by the spigot during assembling of the pipes, it is, however, advantageous to place the rigid ring member close to the front, that is, closed to a leading edge.

In one embodiment, the inner peripheral surface of the annular body has a conically shaped portion extending from the sealing portion to define a leading edge with the outer surface portion. In another embodiment, the inner peripheral surface has a second portion spaced from the sealing portion and defining a leading edge with the outer peripheral surface.

The reinforcing member may either be completely or partially embedded within the annular body and may be of any suitable cross-sectional shape to obtain the specific advantages desired in each case. For example, the reinforcing member may be a ring of annular or curvilinear cross-section or may be made of a pair of annular rings with a plurality of webs connecting the rings together.

The inner peripheral sealing portion of the annular body can be rounded or flat or can be formed as a sealing lip. Similarly, the annular body may have a rounded or flattened outer radial portion.

The combined mold element and sealing ring can be positioned in a pipe joint comprised of two pipes. For example, where the pipes are made of PVC, the mold element is mounted on a drift of a mold apparatus and one pipe end is heated and forced over the mold element. This causes the pipe end to form a socket with an internal annular groove or race-way about the mold element as described in my copending application. Thereafter, the mold element and pipe socket are removed from the mold apparatus, and the end of another pipe is inserted as a spigot into the socket end.

The sealing elements can be manufactured economically and with very close tolerances. This is achieved by making the sealing element with very little elastically yieldable material, i.e., very little rubber bulk and by anchoring the rubber bulk to a rigid ring member in a portion radially opposite the sealing portion. In the case of ordinary rubber sealing rings there are limitations in how small the rings can be made because rings with little rubber bulk are easily dislocated or pressed out of the race-way by joining of a pipe-line or pressed out into the annular gap between a spigot end and socket end by internal pressure in a pipe line.

It is a general tendency that sealing rings and especially unreinforced sealing rings may be squeezed out of the gap spacing the spigot end from the socket end when exposed to high internal pressure. This may also be the case with sealing rings reinforced with rigid ring members of minor thickness. However, in the present case, this problem can be solved by using a reinforcing member provided with a minimum cross-sectional dimension, i.e., a cross-section diameter, greater than the annular space separating the outer surface of the spigot end from the inner surface of the socket end.

Other limitations of ordinary sealing rings reside in the need for relatively large production tolerances which demand relatively much rubber volume to assure the sealing effect between socket and spigot. By locating the rigid ring member close to or in the same radial plane as the sealing area of the sealing ring, it is possible to produce sealing rings with very close diameter tolerances in the sealing area. This allows the rubber bulk to be reduced without influencing the sealing property of the sealing ring and at the same time eliminates the possibility of dislocating or pushing out the rubber ring with the spigot end during assembling or by internal pressure in the pipe-line.

Further, because the bulk of the sealing ring can be reduced, it is also possible to reduce the height of the race-way. This reduces the stretching and the thinning of the race-way and thus gives great advantages to the strength of the pipeline.

These and other objects and advantages of the invention will become more apparent from the following detailed description and appended claims taken in conjunction with the accompanying drawings, in which:

FIG. 1 illustrates a part cross-sectional view of a combined mold element and sealing ring in accordance with the invention;

FIG. 2 illustrates a part cross-sectional view of a modified combined mold element and sealing ring having a second inner peripheral portion defining a leading edge with an outer surface portion in accordance with the invention;

FIG. 3 illustrates a part cross-sectional view of a further modified combined mold element and sealing ring having a rounded leading edge in accordance with the invention;

FIG. 4 illustrates a part cross-sectional view of a further modified combined mold element and sealing ring having a reinforcing member of curvilinear cross-section in accordance with the invention;

FIG. 5 illustrates a part cross-sectional view of a further modified combined mold element and sealing ring having a reinforcing member composed of a pair of rings of circular cross-section;

FIG. 6 illustrates a part cross-sectional view of a modified mold element and sealing ring having a sealing lip on the inner periphery in accordance with the invention;

FIG. 7 illustrates a part cross-sectional view of a combined mold element and sealing ring similar to that of FIG. 2 on a drift of a mold apparatus;

FIG. 8 illustrates a part cross-sectional view of a combined mold element and sealing ring similar to that of FIG. 2 on a drift of a mold apparatus with a pipe socket formed thereover;

FIG. 9 illustrates a part cross-sectional view of a combined mold element and sealing ring similar to that of FIG. 2 in a pipe socket;

FIG. 10 illustrates a part cross-sectional view of a pipe joint in a pipe line with internal pressure imposed on the combined mold element and sealing ring similar to that of FIG. 2; and FIG. 11 illustrates a part sectional view of one embodiment of a die for manufacturing of a combined mold element and sealing ring in accordance with the invention.

Referring to FIG. 1, the combined mold element and sealing ring 20 is formed of an annular body 21 of elastically yieldable material, such as rubber, and a rigid reinforcing non-elastic member 22. The annular body 21 is of a cross-section which is mainly dropshape and has an inner peripheral surface defining a rounded radially inwardly protruding sealing portion 23 and a plain, conically shaped portion 24 extending from the rounded portion 23, an obliquely extending (i.e., conical) outer surface portion 25 on one side which forms a leading edge 26 with the conical portion 24, an outer peripheral surface having a rounded outer radially directed surface portion 27 adjacent the surface portion 25 and a rounded nose portion 28 on the opposite side. As shown, the rigid member 22 which is in the form of an annular ring with a circular cross-section is embedded close to the nose portion 28, i.e., at a point where the nose portion 28 and the outer radial portion 27 merge. As shown, the surface of the ring member 22 is close to a transition area between the nose portion 28 and outer peripheral portion 27.

As shown in FIG. 1, the radial plane A through the mid-point of the sealing portion or rounded portion 23 is located between the radial plane B of the member 22 and a leading side portion defined between the conical inner surface portion 24 and the conical outer surface portion 25. The radial plane is defined as a plane with a 90° angle with the center line of a pipe.

Referring to FIG. 2, wherein like reference characters indicate like parts as above, the combined mold and seal ring 30 has a plain or slightly conical inner portion 41 spaced from the sealing portion 23. This portion 41 tapers radially outwardly towards the conical portion 25 to form the leading edge 26. In addition, a recessed portion 42 of concave shape is formed between the sealing portion or rounded portion 23 and the portion 41. As shown in FIG. 2, the radial plane B of the member 22 is located between the radial plane A through the midpoint of the sealing portion or rounded portion 23 and a radial plane G through the leading surface portion 25. The position of the ring member 22 is chosen at a level radially outside the leading edge 26 of the mold element 40 in order, thereby, to ensure an intentional pressing down of the leading edge 26 during the pushing-on of a hot pipe end over the unit 40.

Referring to FIG. 7, a mold apparatus 31 for forming a socket in an end of a thermoplastic pipe (not shown) to receive a combined mold element and sealing ring 40 (similar to FIG. 2) includes a drift 32 with a recess 33 and a support ring 34. The recess 33 in the drift 32 accomodates the annular body 21 of the unit 40, and the support ring 34 is shaped to mate with the nose portion 28 and to force the nose portion upwards to avoid any tilting of the mold element that could cause "fish mouthing" with the pipe end and mold element during pushing on the hot pipe end (FIG. 8). The manner of forming a pipe end over the combined mold and sealing ring 40 in the mold apparatus 31 is similar to that as described in my copending application and need not be further described. As shown in FIG. 8, after forming, a pipe 35 is bulged radially outwardly over the unit 40 and has a groove or race-way 36 in which the unit 40 is received. As shown, the inner diameter $d$ (FIG. 9) of the unit 40 is less than the inner diameter D of the socket end of the pipe 35. Also, as shown, the pipe 35 and unit 40 mate against each other almost continuously from the nose portion 28 to the leading edge 26 (depending somewhat on pipe thickness).

As shown in FIG. 10, after positioning of a second pipe 37 having a chamfered spigot end within the pipe 35, the unit 40 forms a tight seal between the pipes 35, 37. As shown, the inner pipe 37 has an outer diameter greater than the inner diameter of the unit 40. Thus, the body 21 of the unit 40 is compressed and yieldably deformed. However, the ring member 22 is not deformed and remains in original shape. This serves to positively retain the unit 40 in place against pressure imposed on the unit 40 within the gaps between the pipes 35, 37.

As visualized in FIG. 10, the sealing ring is pressed into the annular gap between the socket 35 and spigot 37 by internal pressure in the pipe line but is anchored by the reinforcement of the ring 22, e.g., a steel ring, molded into the rubber bulk of the annular body 21.

FIG. 7 further illustrates how the reinforcement ring member 22 together with the supporting ring 34 securely holds the mold element on the drift 32 by compressing the rubber bulk against the drift 32. The dotted line shows the unloaded position of the nose portion. The reinforcing ring member 22 allows the rubber bulk to be pressed against the drift surface without allowing the outer portion of the mold element to be stretched or dislocated, and the supporting ring 34 avoids any tilting of the mold element. This allows a hot pipe end to be pushed over the drift 32 and the mold element 40 while retaining the correct outer contours of the raceway when the pipe has been shrunk, sucked and cooled down according to U.S. Pat. No. 3,776,682, as shown in FIG. 8. In FIG. 8, the dotted lines show the position of the nose portion before retraction of the supporting ring 34.

The drift 32 according to FIG. 7 has longitudinal slots 38 to allow air to be sucked out on both sides of the mold element via vacuum bores (not shown). In order to avoid "fish-mouthing" and to assure a good positioning of the mold element on the drift 32, a small recess 33 for the mold element is provided above the longitudinal slots 38. The section C, as marked with crossing lines, shows the compression of the mold element against the drift 32.

Referring to FIG. 2, by positioning the ring member 22 over the sealing portion 23 or in a direction towards the leading edge 26, any tilting of the mold element is avoided during movement of the mold element axially on a drift, and no "fish mouthing" occurs during the following pushing on the hot pipe end. In case the ring member 22 is positioned more to the left, as viewed, the tilting and "fish mouthing" can be avoided by using a support ring 34, as shown in FIG. 7, to lift up the nose section and force the leading edge 26 down on to the drift.

Referring to FIG. 3, wherein like reference characters indicate like parts as above, the combined mold and sealing ring 50 may be formed with a different cross-section from a drop-shape. As shown, the unit 50 may have a rounded leading portion 51 on one side adjacent the conical surface portion 25. This leading portion 51 merges with the inner peripheral portion 23 to define a concave recess therebetween. The cross-section of the unit 50 is suitable for a mold apparatus as described in U.S. Pat. No. 3,793,427.

Referring to FIG. 4, the combined mold element and sealing ring 60 may also be formed with a ring member 61 which is of curvilinear cross-section. As shown, the ring member 61 is in the form of a metal hoop ring member of especially rigid form, which is particularly favorable for the reception of external as well as internal radial loadings. The ring member 61 is disposed with an exposed surface between the nose portion 28 and outer peripheral portion 27 of the annular body 21. In this way, the ring member 61 is especially suitable for forming an internal support for the socket end in the weakened stretched race-way. The ring member 61 will, in addition, form an effective support for the sealing ring and prevent the unit 60 from being pressed into the annular gap between spigot end and socket end by internal excess pressure in the pipe line, as illustrated in FIG. 10.

It is apparent that the ring member 22 can be designed in various other ways and can be positioned in various ways other than those which are shown in order to be adapted according to existing support means of the mold apparatus or in order to satisfy other demands of the sealing ring, If desired, as shown in FIG. 5, two or more ring members 62 can be combined in one and the same construction and, moreover, such ring members 62 can be connected to each other into a coherent rigid member, for example with separate connecting webs 63 between the rings 62.

Further, as shown in FIG. 6, the combined mold element and sealing ring 70 may be formed with an internal peripheral portion 71 which defines a sealing lip (shown in an unloaded state). In this case, a recess 72 is formed between the sealing lip 71 and the plain portion 41. Thus, instead of forming a compression seal when in place, a lip seal is formed.

As shown in FIG. 8 and 10, pressure areas E are initially formed in the sealing portion 23 of the unit 40 when moving the unit 40 into position on the drift as illustrated in FIG. 7 and, thereafter, are formed in the outer periphery after the hot pipe end is moved over the unit 40, as illustrated in FIG. 8, and hence cooled and shrunk radially towards the unit 40 and the drift 32. In these manufacturing steps of the pipe socket end, the rigid ring member 22 reinforces the unit 40 in order to control the pressure effects involved in the internal as well as in the external parts of the unit 40. Referring to FIG. 9, after the socket end and the associated unit 40 are removed from the drift, the pressured areas as illustrated in FIG. 8 are substantially released. The remaining compression as illustrated in areas F assures a good bite and prevents dirt and the like from penetrating into the sealing areas. When moving a spigot end into a socket end, the unit 40 will be compressed similarly to the compression illustrated in the manufacturing step of FIG. 8 and similar pressure areas will arise in the socket end and in the spigot end. Referring to FIG. 10, when a pressure medium is transported through a pressure pipe line incorporating the illustrated pipe joint, the medium is allowed to penetrate into a gap formed between the sealing unit 40 and the socket end. In this latter case, the pressure areas E of the unit 40 are located as indicated in FIG. 10. The effect of the pressure areas provided by the resilient body 21 of the sealing unit 40 in cooperation with the reinforcing ring member 22 of the sealing unit provides an effective seal against leakage between the socket end and the spigot end of the illustrated pipe line joint.

Referring to FIG. 11, a sealing unit 40 can be formed in a mold in a known manner. For example, the unit 40 can be formed in a cavity 80 formed between three separate, cooperating die parts 81, 82, 83. The manufacturing of the sealing unit 40 is made by locating a prefabricated steel ring member 22 in the cavity 80 on a set of pins 84 which might be withdrawable. Only one pin is illustrated in the drawing in dotted lines. These pins 84 protrude from the internal side of one part 82 of the die in mutually spaced relation along the internal side of the die part. By means of such pins, each ring is supported in a relatively accurate manner in the die to secure accurate reinforcing effects in the unit 40 produced therein. Before the produced unit is removed from the die, the pins 84 are withdrawn from the unit and the associated die part. The elasticity of the rubber allows release of the unit 40 from the mold and the pins, even if the pins are permanently connected to the mold surface and are not movable relative thereto.

The mold portions are withdrawn in directions $x$, $y$, relative to the unit in order to release the unit 40.

All the accompanying figures of the combined sealing and forming element cross-section show the reinforcement placed near the rubber bulk surface. However, the reinforcement can be located in spaced relation from the outer surface.

I claim:

1. A combined mold element and sealing ring comprising
an annular body of elastically yieldable material, said body having opposite side portions, an inner peripheral surface defining at least one radially inwardly protruding sealing portion located between said opposite side portions, and an outer peripheral surface having an outer radially directed surface portion located between said side portions; and
a rigid reinforcing non-elastic member disposed in said body and located in an area defined between said opposite side portions and spaced radially outside said protruding sealing portion.

2. A combined mole element and sealing ring as set forth in claim 1 wherein said inner peripheral surface has a plain portion extending from said sealing portion to define a leading edge with said outer peripheral surface.

3. A combined mold element and sealing ring as set forth in claim 1 wherein said inner peripheral surface has a second portion spaced from said sealing portion and defining a leading edge with said outer peripheral surface.

4. A combined mold element and sealing ring as set forth in claim 1 which further includes an obliquely extending leading surface portion at one of said side portions and wherein said reinforcing member is located in said body close to a transition portion between said outer surface portion and said leading surface portion.

5. A combined mold element and sealing ring as set forth in claim 4 wherein a radial plane through the center line of said reinforcing member is located between a radial plane through the sealing portion and a radial plane through said leading surface portion.

6. A combined mold element and sealing ring as set forth in claim 1 which further includes a rear surface portion at the other of said side portions and wherein said member is located close to a concave transition portion between said outer surface portion and said rear surface portion.

7. A combined mold element and sealing ring as set forth in claim 6 wherein a radial plane through the center line of said reinforcing member crosses a main part of said sealing portion.

8. A combined mold element and sealing ring as set forth in claim 1 wherein said reinforcing member is an annular ring of circular cross-section.

9. A combined mold element and sealing ring as set forth in claim 1 wherein said reinforcing member is an annular ring having a curvilinear cross-section.

10. A combined mold element and sealing ring as set forth in claim 1 wherein said reinforcing member includes a pair of annular rings and a plurality of webs connecting said rings together.

11. A combined mold element and sealing ring as set forth in claim 1 wherein said reinforcing member is completely embedded within said body.

12. A combined mold element and sealing ring comprising
   an annular body of elastically yieldable material, said body having an inner peripheral surface defining at least one radially inwardly protruding sealing portion, an outer peripheral surface having an outer radially directed surface portion, and a nose portion one one side; and
   a rigid reinforcing non-elastic member disposed in said body and located in an area spaced radially outside said protruding sealing portion.

13. A combined mold element and sealing ring as set forth in claim 12 wherein said body includes a rounded leading surface portion on a side opposite said nose portion.

14. A combined mold element and sealing ring as set forth in claim 12 wherein said body includes an obliquely extending leading surface portion on a side opposite said nose portion and a plain surface on said inner peripheral surface defining a leading edge with said leading surface portion.

15. A combined mold element and sealing ring comprising
   an annular body of elastically yieldable material, said body having a rounded inner peripheral sealing portion, a plain inner portion spaced from said peripheral portion, an obliquely extending outer surface portion on one side forming a leading edge with said plain inner portion, a rounded outer peripheral portion adjacent said outer surface portion, and a rounded nose portion on an opposite side; and
   a rigid reinforcing ring embedded in said body radially outside said sealing portion and located between a radial plane passing through the sealing portion and a radial plane passing through said leading surface portion.

* * * * *

UNITED STATES PATENT AND TRADEMARK OFFICE
CERTIFICATE OF CORRECTION

PATENT NO. : 4,061,459
DATED : December 6, 1977
INVENTOR(S) : Gunnar Parmann

It is certified that error appears in the above-identified patent and that said Letters Patent are hereby corrected as shown below:

Column 1, line 31 after "rubber" insert -- . --

Column 5, line 66, change "pressure" to -- pressures --

Column 8, line 26, change "mole" to -- mold --

Signed and Sealed this

Eleventh Day of April 1978

[SEAL]

Attest:

RUTH C. MASON
Attesting Officer

LUTRELLE F. PARKER
Acting Commissioner of Patents and Trademarks